Jan. 9, 1962 G. A. VAN DINE 3,016,470

SHIFT REGISTER

Filed April 14, 1959

INVENTOR
G. A. VAN DINE
BY S. E. Hollander
ATTORNEY

United States Patent Office 3,016,470

Patented Jan. 9, 1962

3,016,470

SHIFT REGISTER

Gilbert A. Van Dine, Madison, N.J., assignor to Bell Telephone Laboratories, Incorporated, New York, N.Y., a corporation of New York Filed Apr. 14, 1959, Ser. No. 806,284
16 Claims. (Cl. 307—88.5)

This invention pertains to electronic circuits and more particularly to shift register circuits.

Shift register circuits are capable of various logical functions. Basically, these circuits include a number of serially connected bistable memory stages, input means for placing one or any number of these memory stages in either bistable condition, a means for shifting the condition of each stage to the next succeeding stage, and means for sampling an output from any or all stages after a predetermined number of input and shifting operations.

In many situations the input signals to a shift register determinative of each of the bistable conditions of the memory stages appear as output signals of two distinct circuits. That is, the input signals to the circuit for determining the conditions of the memory stages of the shift register appear on individual input leads. In such a case the circuit is referred to as a "double-rail" circuit, the cognomen being descriptive of the twin input terminals.

It is an object of this invention to provide an improved shift register circuit for handling double-rail input information.

Shift register circuitry handling double-rail input information may be conveniently utilized in various electronic switching systems such as telephone switching systems. In electronic telephone switching systems it is desirable that the portions thereof peculiarly adapted to perform functions distinct to small groups of subscribers be positioned adjacent to those groups and therefore remote from the main or central office equipment which is utilized for coordinating and servicing a large number of groups of subscribers. The means for supplying power to any remotely positioned equipment always presents a problem dependent in complexity on the distance separating the power sources and the remote equipment, the size of the remote equipment, and the number of individual sources and amount of power required by the remote equipment. If the remotely positioned circuitry includes shift register circuitry as is desirable in certain instances, supplying the power requirements thereof presents a serious problem.

It is therefore an object of this invention to provide shift register circuitry having low average power requirements.

Further, in the case of such remote positioning of telephone switching circuitry, the physical size of the various components must be kept to a minimum.

Thus, another object of this invention is to provide improved shift register circuitry adaptable to remote positioning and having minimum physical dimensions.

One way of reducing the physical dimensions of switching systems is to design the various component circuits so they may be utilized for more than a single specific operation.

It is therefore an object of this invention to provide shift register circuitry which includes portions adaptable to perform a variety of functions.

Another way of reducing the size of switching systems involves reducing the number of elements in each component circuit. Many prior art shift registers utilize memory stages each of which include a large number of elements. Such memory stages, for instance, include individual active circuit elements for each of the bistable conditions.

Since a large number of elements is not compatible with small physical dimensions, it is an object of this invention to provide an improved shift register circuit including a minimum number of components and wherein the memory stages each include a single active element.

A prime requisite of shift register circuits, as herein contemplated, is certain delay circuitry. This delay circuitry is necessitated by the basic manner in which the operation of shifting the condition of each stage to the next succeeding stage is accomplished, as explained herein. Each bistable memory stage has two operating conditions, each of which is indicative of the information state of that memory stage. Each condition of a memory stage necessarily requires the application of a different conditioning signal thereto. In a double-rail circuit, as herein contemplated, wherein each memory stage contains but a single active element, the two conditions indicative of the two input information signals may advantageously be the "off" and "on" operating conditions of that active element.

To reduce the component and functional complexity of a shift register it is desirable that the shifting function of the circuit be initiated by the two input information signals for in this manner various external control circuitry is eliminated. Shifting a signal from one memory stage to the next requires that the stage from which the signal is shifted be left in a "cleared" condition. In conventional shift register circuitry it has often been necessary to supply separate "clear" and "shift" pulses from external circuitry adapted to perform these functions. An evident reduction in cost and complexity would be afforded if the need for the external "shift" and "clear" circuitry could be obviated.

It is therefore an object of this invention to dispense with the necessity for separate external "shift" and "clear" circuitry.

Another object of this invention is to provide for self-generation within the shift register of the required "shift" and "clear" pulses in response to input pulses.

Since the memory devices utilized have but two operational conditions, the cleared condition may advantageously be identical with one of the information conditions, i. e., either off or on. Thus any shifted signal or input information signal which is such as to initiate the non-cleared condition of the memory devices must be delayed until the clearing operation has taken place so that the various conditioning signals for opposing states of operation do not interfere with each other. This requires delay circuitry. To satisfy the general objects of this invention the delay circuitry should have minimum physical dimensions and include a minimum number of components.

It is therefore another object of this invention to provide a double-rail shift register circuit in which all of the functions are initiated by the double-rail input signals.

Another object of this invention is to provide improved delay circuitry of minimum physical dimensions and including a minimum of components for utilization in shift register circuits.

In any electronic circuit a reduction in total cost and complexity is afforded when a single simplified portion of circuitry is utilized to accomplish the functions theretofore accomplished by a plurality of portions.

It is, therefore, a specific object of this invention to provide a unitized portion of circuitry for use in a shift register circuit capable of controlling the clearing, delay and shifting functions of that shift register.

Briefly these objects are accomplished in accordance with aspects of this invention by a shift register circuit which comprises a single memory element in each memory stage and which includes novel circuitry incorporating aspects in input, shifting, clearing, and delay in a single group of compact circuitry.

More specifically, the circuit of the present invention includes as the main memory element for each stage a single two-terminal PNPN transistor which may illustratively be of the type disclosed by W. Shockley in Patent 2,855,524 which issued on October 7, 1958. These transistors are capable of operation in a high impedance state and a low impedance state depending on the amount of current conducted therethrough. Specifically, for currents below a predetermined value, operation is in the high impedance or "off" state while for currents above that predetermined value, operation is in the low impedance or "on" state.

A first and a second conditioning means are provided to each stage to provide the currents requisite to place the transistors in the two operational states. The control of the first and second conditioning means to determine the state of each memory element is accomplished by the external double-rail input sources through two groups of circuitry. A first group of circuitry is connected to the first conditioning means of the first memory stage and a first one of the double-rail input sources and operates upon pulling to apply a "turn-on" potential to the memory element of the first memory stage only. In addition, this first group of circuitry includes delay circuitry so that the conditioning potential is advantageously applied to the first stage memory element for a period of time after the clearing function has been accomplished. As is explained hereinafter, the clearing operation applies a conditioning signal to the memory element; by delaying the conditioning signal initiated by the first source, interference between different conditioning signals, mentioned supra, is effectively eliminated.

A second group of circuitry is connected to the second conditioning means of all stages and to both the first and a second of the double-rail input sources. This group of circuitry operates in response to a pulse from either source: first, to apply a "turn-off" potential to the memory elements of all memory stages to clear the stages; second, to delay the shifting function for a requisite period until the accomplishment of the clearing function; third, to initiate the shifting operation; and, finally, to remove the conditioning signals requisite to the clear and shift functions after a longer suitable delay.

Basically, this unitized and simplified group of circuitry includes a current dependent switch connected to a source of potential and the memory elements so that an input pulse from either external source of pulses operates the switch to apply the potential as an "off" conditioning signal to the memory elements of each stage and thereby clear the stages. The switch is such that once conducting it remains so as long as requisite current is provided. Charging means are connected to the switch for providing, in response to current flow through the switch, an increasing potential to finally remove the requisite current and open the switch to remove the clearing signal from the memory elements.

The switch also operates when conducting to connect the charging means to a voltage sensitive pulsing source. This source functions, after a suitable delay provided by the time required for potential build-up on the charging means, in response to the voltage on the charging means, to apply a shifting conditioning signal to all but the first one of the first conditioning means and shift the prior condition of each of the preceding memory stages, the condition being remembered by the first conditioning means, to the next memory stage.

It is a feature of this invention that a shift register circuit utilizes a single two-terminal PNPN transistor as the basic memory element in each memory stage.

Another feature of this invention concerns the use of one or more PNPN transistors in series with a capacitor in the clearing circuitry to accomplish energization and turn-off of that circuitry.

Another feature of this invention relates to the use of a Zener diode connected to the base of a transistor which controls the shifting function of a shift register circuit to delay that shifting function. The transistor is connected to shifting capacitors, and upon the breakdown of the Zener diode turns on and conditions those capacitors for shifting the remembered condition of prior stages to succeeding stages. The control of the Zener diode by the voltage build-up on the capacitor of the clearing circuitry is important in reducing the over-all size of the clearing, delay and shifting circuitry as it combines the components for accomplishing those operations.

Another feature of this invention relates to the use of integrating circuitry for controlling the operation of a transistor to "stretch" and thus delay first input pulses until the completion of the clearing function.

These and other objects and features of this invention will be better understood upon consideration of the following detailed description and the accompanying drawing, in which.

Figures 1, 2:
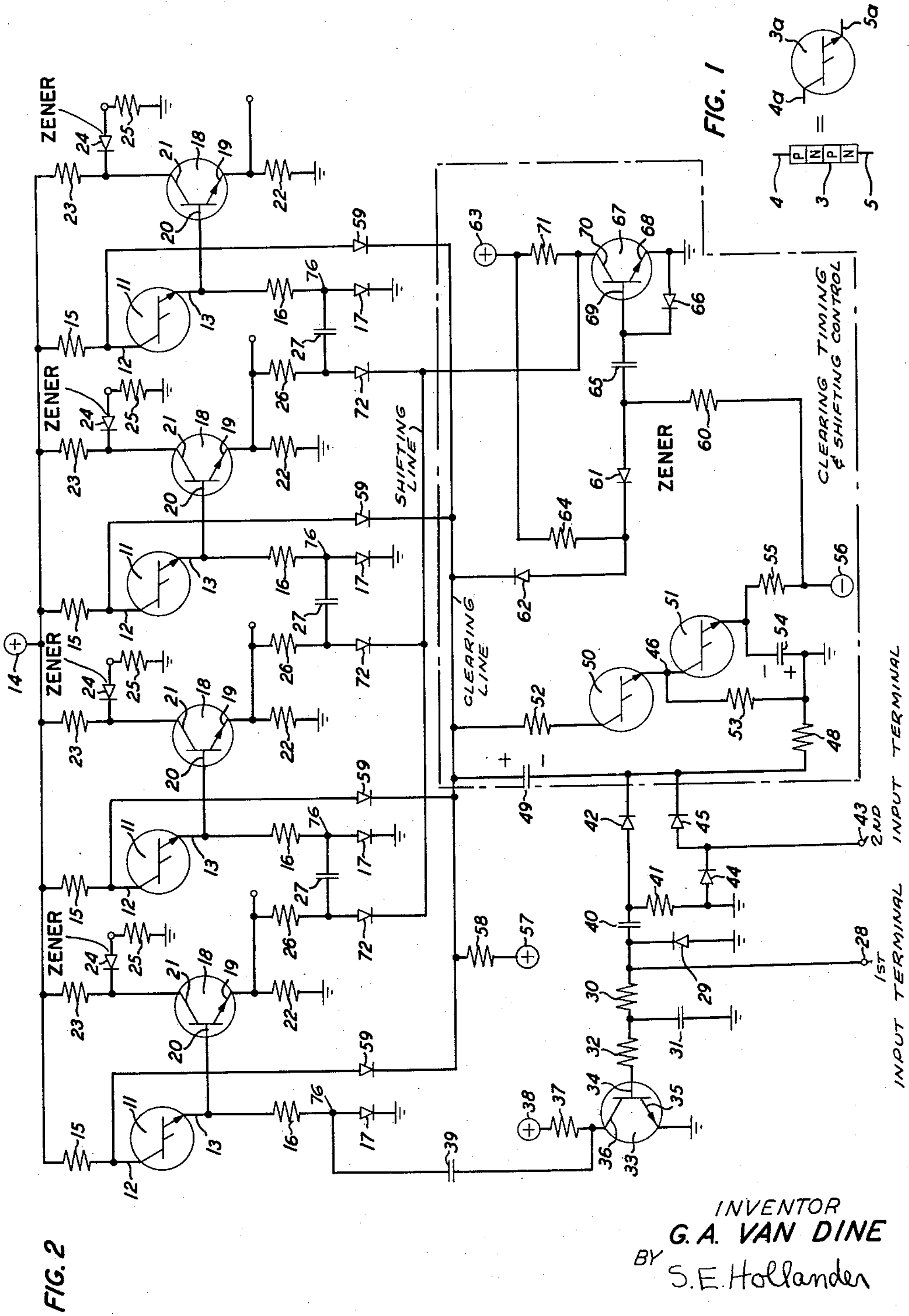
FIG. 1 is a diagram which equates the symbolism heretofore employed to illustrate a two-terminal PNPN junction transistor to the symbolism adopted herein.
FIG. 2 is a schematic representation of a shift register circuit illustrative of the various aspects of this invention.

Referring now to FIG. 1 there is shown in block diagram form a two-terminal, four-layer, PNPN junction transistor 3 having a first terminal 4 and a second terminal 5. This transistor 3 may illustratively be of the type disclosed in the Shockley patent, mentioned supra. Equated thereto is an identical two-terminal PNPN junction transistor 3*a* shown, however, in schematic form. This transistor 3*a* has a first terminal 4*a* corresponding to the terminal 4 of the transistor 3, and a terminal 5*a* corresponding to the terminal 5 of the transistor 3.

*The memory stages*

Referring now to FIG. 2 there is illustrated a shift register circuit including four memory stages each of which stages comprises a two-terminal PNPN junction transistor 11.

Each of the transistor devices 11 has a high impedance and a low impedance stable state or condition of operation, the state being determined by the amount of current passed therethrough. Each of the transistors 11 operates in the high impedance state for current flow therethrough of a value less than a first predetermined, comparatively minute, value. Each transistor 11 has a first terminal 12 and a second terminal 13. When sufficient voltage is applied across the terminals 12 and 13 of any transistor 11 to pass a current therethrough greater than the predetermined value, the transistor 11 passes through an unstable region of operation and into a stable low impedance state in which state it remains while a current greater than the predetermined value is supplied. The voltage required to maintain the transistor 11 in the low impedance state is much less than that required for switching to the low impedance state originally. The maintaining voltage might be, for example, only one-fortieth of that required for switching. Further, the current which may flow in the low impedance state is of a much greater value than the predetermined switching value.

If the voltage applied to any transistor 11 is reduced to a point where insufficient current is provided to sustain operation in the low impedance state, the transistor 11 reverts to the high impedance state, wherein it presents substantially an open circuit to current flow therethrough.

Each transistor 11 has connections thereto at the first terminal 12 and the second terminal 13. Connecting each terminal 12 to a source of positive potential 14 is one of a plurality of resistors 15. Serially connecting each terminal 13 to ground are one of a plurality of resistors 16 and one of a plurality of diodes 17. The resistors 15 and 16 are of values such that insufficient current is furnished by the source 14 to any transistor 11 operating in the high impedance state to cause that transistor 11 to switch to the low impedance state, yet such that the source 14 furnishes adequate current to maintain all transistors 11 operating in the low impedance state in that state.

Four NPN junction transistors 18 are arranged as current amplifiers to isolate the voltages appearing at the terminals 13 of the transistors 11. Each transistor 18 includes an emitter terminal 19, a base terminal 20, and a collector terminal 21. Each emitter terminal 19 is connected to ground through one of a plurality of resistors 22. Each base terminal 20 is connected directly to the terminal 13 of one of the transistors 11, and each collector terminal 21 is connected to the source 14 through one of a plurality of resistors 23. In this manner each transistor 18 is biased to operate as an isolating amplifier of the voltages appearing across the connected resistor 16. It is to be noted that the voltages appearing at each terminal 13 are inverted and amplified in their current level at the collector terminal 21 and are merely amplified at the emitter terminal 19.

A Zener diode 24 is connected at each collector terminal 21 in such a manner that no voltage appears across an output resistor 25 connected thereto and to ground until the voltage across the Zener diode 24 increases to a value greater than the Zener value, which may illustratively be 20 volts. The circuit parameters are so adjusted that the Zener voltage is not reached and thus no voltage appears across the resistor 25 until the transistor 18 is in the off condition. Since the transistor 18 is in the off condition only when the connected transitsor 11 is in the high impedance condition, a voltage across the resistor 25 is indicative of the high impedance state of the transistor 11. When the connected transistor 11 is in the high impedance state, the voltage furnished by the source 14 breaks down the diode 24 and the consequent current flow through resistor 25 produces an output voltage thereacross. When the transistor 11 is in the low impedance state, on the other hand, the current therethrough and through the emitter 19 of the operating transistor 18 produces a positive voltage across the resistor 22. The circuit is thus adapted to furnish a double-rail output at each memory stage, the presence of an output signal other than ground at either of the resistors 22 or 25 being dependent on the impedance state of the connected transistor 11.

The emitter terminal 19 of each transistor 18 is connected to the terminal 13 of each succeeding transistor 11 by a serial arrangement including a resistor 26 and a capacitor 27, provided to facilitate the shifting operation of the circuit 10 as explained herein.

It is apparent that when any transistor 11 is in the low impedance state the current therethrough produces a voltage across the resistor 16 which is repeated by the transistor 18 following. The current through the transistor 18, during the time a positive voltage is applied at the base terminal 20 thereof, creates a voltage drop across the resistor 22 and causes a voltage to build up on the capacitor 27 due to its connection to the resistor 22 and the emitter terminal 19 through the resistor 26. During the period when any transistor 11 is in the high impedance state and ground is applied at the base terminal 20 of any transistor 18, no appreciable current flows through the transistor 18 and no voltage build-up occurs on the capacitor 27 connected thereto. Both terminals of the capacitor 27 therefore remain at ground potential due to the connection to ground through the diode 17.

*The input circuitry*

The circuitry for controlling the operation of the circuit of FIG. 2 includes a first input terminal 28 to which positive pulses from a source, not shown, may be directed. This terminal 28 is provided to act as one half of the double-rail input, mentioned supra in the introduction. Connected to the input terminal 28 and to ground is a diode 29 provided to assure that any negative signals which might appear at the terminal 28 are ineffective to operate the circuit. The first input terminal 28 is connected to the clearing portion of the circuit. This clearing circuitry is provided with a plurality of input terminals including the terminal 28 which is connected through a capacitor 40 and a diode 42 to allow the passage of positive pulses only thereto. A resistor 41 is provided connected to ground and between the diode 42 and the capacitor 40 for sharpening any positive voltage pulse which appears thereat.

A second input terminal 43, driven by a source of pulses, not shown, provides the second half of the double-rail input, mentioned supra. The terminal 43 is connected through a diode 44 to ground for eliminating negative pulses and to the diode 42 by a diode 45 whereby positive input pulses are realized at the clearing circuitry from the second input terminal 43 in a manner similar to those from the first input terminal 28.

The two input diodes 42 and 45 are arranged to function as a logical "OR" circuit so that pulses appearing on either the terminal 28 or the terminal 43 are effective to operating the clearing circuitry. Further, the diodes 42 and 45 advantageously prevent a pulse appearing at either input terminal 28 or 43 from feeding back to the other input terminal to effect adversely either the operation of the circuit of FIG. 2 or the operation of the sources of input pulses, not shown, connected to the terminals 28 and 43.

In addition to appearing at the clearing circuitry, positive pulses appearing at the terminal 28 pass through an integrating circuit which is utilized to extend the duration of those pulses and thereby effectively delay their appearance at following portions of the circuit, for reasons to be explained hereinafter. The integrating circuit includes a resistor 30 connected at the terminal 28, a resistor 32 connected to the resistor 30, and a capacitor 31 connected between the resistors 30 and 32 and to ground. The values of the resistors 30 and 32 and of the capacitor 31 are such that the capacitor 31 charges rapidly during the advent of a positive input pulse at the terminal 28. After the termination of the input pulse at the terminal 28 the charge on the capacitor 31 remains and is allowed to dissipate slowly therefrom over a path including the resistor 32 and a transistor 33. Since the charge on the capacitor 31 is utilized to maintain the transistor 33 in the on state after an input pulse has switched it to that state, positive input pulses at the terminal 28 are effectively lengthened.

The input pulse at the terminal 28 is applied, in its lengthened form, to the NPN junction transistor 33 at a base terminal 34 thereof. The transistor 33 has an emitter terminal 35 connected to ground and a collector terminal 36 connected by a resistor 37 to a source of positive potential 38. In this manner the transistor 33 is biased to saturate upon the advent of a sufficient positive pulse at the base terminal 34, such as the pulses advantageously furnished at the terminal 28.

The collector terminal 36 is connected by a capacitor 39 to the resistor 16 and the diode 17 of the first memory stage. In the static condition the collector terminal 36 of the transistor 33 is at the voltage of the source 38. Upon the advent of a positive input pulse at the terminal 28 and the concomitant saturation of the transistor 33, the voltage at the collector terminal 36 drops to ground so that a negative input pulse is applied through the capacitor 39 to the first memory stage at a point between the resistor 16 and the diode 17. The diode 17 and the input terminal 76 are a means for alowing the application of a negative turn-on pulse to each stage. The capacitor 39 is of a value with respect to the impedance of the memory stage such that the charge on the capacitor 39 remains thereon for an extended period. The voltage furnished by the source 38 is advantageously adapted to be such that the negative pulse applies a first input voltage in conjunction with the voltage furnished by the source 14 across the transistor 11 of the first memory stage sufficient to switch that transistor 11 to the low impedance state by increasing the current therethrough to a value greater than the predetermined switching value.

*Combined clearing, delay and shifting circuitry*

A. *Clearing.*—As mentioned supra, the input terminals 28 and 43 are connected to the clearing circuitry by the diodes 42 and 45, respectively. Each diode 42 and 45 is connected to ground through a resistor 48. The diodes 42 and 45 are additionally coupled through a capacitor 49 to act as the input to the clearing circuitry. The clearing circuitry includes two series-connected, two-terminal, PNPN junction transistors 50 and 51 which may advantageously be of the same type as the transistors 11 of the memory stages. The capacitor 49 is directly connected to a resistor 52 which is connected to the first PNPN transistor 50. The second PNPN transistor 51 is connected to ground through a capacitor 54 and to a source of negative potential 56 through a reistor 55. An additional connection to ground is made between the transistors 50 and 51 by a resistor 53.

During the high impedance state of the transistors 50 and 51 a negative charge collects on the capacitor 54 due to the potential furnished by the source 56. The charge on capacitor 54, collected when transistors 50 and 51 are in the high impedance state, is shown symbolically on the drawing with the appropriate polarity. Connected to the resistor 52 and thus applying positive bias voltage to the transistors 50 and 51 is a source of positive potential 57, connected thereto by a resistor 58. In addition, the source 14 is applied through the resistors 15 and a plurality of diodes 59 to the resistor 52. The sources 14 and 57 may illustratively furnish identical positive potentials. The source 57 is required in order to maintain the voltage at the transistor 50 constant since the drop across the resistors 15 varies with the state of the transistors 11. This voltage variance would cause the bias on the transistors 50 and 51 to vary were the source 57 absent.

The voltage applied across the transistors 50 and 51 is such that it approaches, in one specific embodiment in which the transistors 11, 50 and 51 are identical, that necessary to supply the current requisite to break down a single PNPN transistor; therefore, the two transistors 50 and 51 are provided between the resistor 52 and the capacitor 54. It is apparent that a single PNPN transistor might be connected therebetween if one were available requiring a high breakdown potential.

In the static condition the voltages provided by the sources 56, 57 and 14 are not capable of supplying a current great enough to cause the transistors 50 and 51 to switch to the low impedance state. However, the voltage supplied is great enough and the resistors 15, 52 and 58 are of such values that once the transistors 50 and 51 are in the low impedance state, sufficient current is provided therethrough to sustain operation in that state.

During the static condition the capacitor 49 is charged to a potential equal to that potential furnished by the source 57. The polarity of the potential developed during this static condition is shown symbolically on the figure adjacent to capacitor 49. The point 46 between the transistors 50 and 51 is at ground. A positive input pulse at either of the input terminals 28 or 43 raises the potential at the capacitor 49 and thus across the transistor 50 by the amplitude of the voltage input pulse. The value of the input amplitude is adjusted to be such that the total voltage across the transistor 50 is great enough to cause a current to flow therethrough sufficient to switch the transistor 50 to the low impedance state of operation. As the transistor 50 switches to the low impedance state, the surge of current therethrough and the large voltage across the resistor 53 cause sufficient current to flow to switch the transistor 51 to the low impedance state.

The input pulses furnished through the diodes 42 and 45 may advantageously be of very short duration so that when the transistors 50 and 51 have switched to the low impedance state, the input voltage is removed and the voltage across the resistor 52 and the transistors 50 and 51 is controlled by the voltage furnished by the source 14, via the resistors 15 and the diodes 59, and that built up on the capacitor 54 which voltage, as mentioned supra, is sufficient to maintain sustaining current through the transistors 50 and 51. At this point the capacitor 54 begins to discharge.

Before discussing the effect of the discharge, the clearing operation will be considered. In the low impedance state, the total voltage dropped across the PNPN transistors 50 and 51 aggregates, in the case of one illustrative type of PNPN transistor, approximately two to three volts while in the high impedance state the drop across both the transistors 50 and 51 may reach approximately one hundred volts.

Thus, to switch the transistors 50 and 51 to the low impedance state is to effectively apply the negative voltage built up on the capacitor 54 and the positive voltage furnished by the source 14 across the resistor 52 and the parallel-connected resistors 15, since the voltage drop across the transistors 50 and 51 is small enough that it may be ignored in computations. The resistors 52 and 15 are adjusted in value so that this switching, including the removal of the large impedance represented by the high impedance state of the transistors 50 and 51, causes a large potential drop at the terminals 12 of the transistors 11 such that the voltage across the transistors 11 becomes inadequate to supply sufficient sustaining current. With the removal of sustaining current the transistors 11 all switch to the high impedance or "cleared" state. Thus the circuitry including the transistors 50 and 51, the charging capacitor 54, the diodes 59, and the resistor 52 provide a means for placing the transistors 11 in the "cleared" state.

As mentioned supra, in the high impedance state of the transistors 50 and 51 a negative voltage buids up on the capacitor 54 due to the current flow from ground through the capacitor 54 and the resistor 55 to the source 56. When the transistors 50 and 51 switch, the current flow through the capacitor 54 reverses, the charge on the capacitor 54 is gradually dissipated, and a positive charge builds thereon. As this positive charge builds the voltage across the transistors 50 and 51 in view of the value of the resistors 15, 52, and 58 is finally reduced below that adequate to supply sustaining current and the transistors 50 and 51 revert to the high impedance state. As the charge on the capacitor 54 changes, the voltage at the terminals 12 is gradually raised. After the transistors 50 and 51 have reverted to the high impedance state the voltage from the source 14 is applied to the terminals 12 of the transistors 11 but, as mentioned supra, is insufficient to switch those transistors 11 to the low impedance state.

B. *Delay and shifting.*—The gradual increase in voltage on the capacitor 54 during the low impedance state of the transistors 50 and 51 is effectively utilized, in addition to operating the clearing circuitry, for providing a novel delay in a circuit which includes a minimum number of components and combines the functions normally attributed to a number of various portions of circuitry for controlling the shifting of pulses between adjacent memory stages.

Connected to the source 56 is a resistor 60 which is connected to a Zener diode 61. A diode 62 is connected to the resistor 52 and to the Zener diode 61, and a source 63 applies its positive potential between the diode 62 and the Zener diode 61 through a resistor 64. The Zener diode 61 is further coupled to ground through a capacitor 65 and a diode 66. An NPN transistor 67 has a base terminal 69 connected to the capacitor 65, an emitter terminal 68 connected to ground, and a collector terminal 70 connected to the source 63 through a resistor 71.

During the high impedance state of the transistors 50 and 51 the voltage across the Zener diode 61 is at the Zener level so that current flows therethrough and produces a voltage across the resistor 60. When the transistors 50 and 51 break down the voltage across the Zener diode reverses in polarity and the capacitor 65 charges quickly through the low impedance path including the diodes 61, 62 and 66. As the voltage at the capacitor 54, and thus at the junction between the resistor 52 and the diode 62, increases due to the current through the transistors 50 and 51, the diode 61 becomes back-biased so current flow therethrough ceases. A very slight current is maintained by the slow discharge of the capacitor 65 through the resistor 60. Eventually, the voltage on the capacitor 54 rises to the point where Zener or break-down voltage is applied across the diode 61. The sudden current flow through the diode 61 reverses the current through the capacitor 65, and the sudden increase in current is applied at the base terminal 69 of the transistor 67, saturating that transistor 67 and causing it to act as a switch to apply ground at the collector terminal 70 thereof.

The collector terminal 70 of the transistor 67 is connected by a diode 72 to each capacitor 27. As mentioned previously, each capacitor 27 has a charge thereon indicative of the prior state of the transistor 11 of the preceding memory stage, a positive charge if the transistor 11 was in the low impedance state before the clearing operation and no charge if the transistor 11 was previously in the high impedance state. The value of the capacitors 27 is adjusted so that the charge thereon is maintained during the clearing operation. Thus, grounding any capacitor 27 which has a positive charge thereon applies a negative pulse to the terminal 13 of the transistor 11 which pulse is sufficient with the voltage from the source 14 to produce a current capable of switching the transistor 11 to the low impedance state and thus shifting the low impedance condition to the succeeding memory stage. The diodes 17 are provided to block the path to ground upon the application of a negative pulse so the voltage across the transistors 11 may be raised sufficiently. If, on the other hand, no charge is present on one of the capacitors 27, the grounding thereof produces no pulse and the transistor 11 remains in the high impedance state. Thus the high impedance condition of the prior memory stage is also effectively transferred.

It is to be clearly noted that the charging of the capacitor 54 which accomplishes the pulsing of the transistor 67 provides a very effective means of delaying the shifting operation until the clearing operation is accomplished and the conditioning signals for accomplishing clearing are substantially removed. The Zener voltage of the diode 61 and the various circuit components are adjusted such that the shifting by grounding the capacitors 27 is delayed until the clearing operation is complete and the voltage at the terminal 12 has risen to a point such that the negative pulse caused by grounding any capacitor 27 is effective to cause sufficient current to flow to switch the connected transistor 11 to the low impedance state.

It is to be noted that both the clearing operation and the timing of the delay for the shifting operation are controlled by the circuitry including the capacitor 54 and the transistors 50 and 51 thereby allowing an over-all reduction in the number and cost of circuit components. The control and timing of the clearing, delay and shifting operations are in a single unitized group of circuitry which includes the especially desirable features of compactness and simplicity.

*Circuit operation*

Assuming that all the transistors 11 are originally in the high impedance state a first positive pulse at either pulse source terminal 28 or pulse source terminal 43 will operate to break down the transistors 50 and 51 and lower the voltage across the transistors 11 below that adequate to sustain operation in the low impedance state. Since all the transistors 11 were assumed in the high impedance, no change thereof will be effectuated.

As the transistors 50 and 51 switch to the low impedance state to apply a clearing voltage to the memory stages, the voltage across the capacitor 54 begins to increase positively. As it increases, the voltage across the capacitor 54 first reaches a point where the voltage across the diode 61 causes the breakdown of that Zener diode 61 to saturate the transistor 67 and shift the condition on all capacitors 27 to the succeeding memory stage. Since all the transistors 11 are assumed to have been priorly in the high impedance state, no charge has built on any capacitor 27 and the grounding thereof does not increase the voltage across any transistor 11 to a point where sufficient current flows to switch that transistor 11 to the low impedance state. Thus the high impedance state is effectively shifted to the next memory stage in each case.

As the charge of the capacitor 54 increases, the point is finally reached where insufficient current is furnished to sustain operation of the transistors 50 and 51 in the low impedance state, and they revert to the high impedance state thereby removing the high-impedance-state conditioning voltage from each of the transistors 11.

If then, the original input pulse appeared at terminal 43, nothing further takes place; and a high impedance state has effectively been applied to the first memory stage. If, however, the original input pulse appeared at the terminal 28, the voltage-lengthening action of the resistors 30 and 32 and the capacitor 31 has first turned on the transistor 33 to increase the voltage across the transistor 11 of the first stage and has then maintained the transistor 33 in the saturated condition so that the negaive pulse is continuously applied to the first memory stage until after the removal of the clearing potentials and the voltage across the transistor 11 of the first stage is such that the transistor 11 is switched to the low imepdance state.

Thereafter, another input pulse at either terminal 28 or 43 operates in a manner identical to the prior input pulse to clear all memory stages and then, after a suitable delay, to shift the signals remaining on the capacitors 27 to affect the succeeding memory stage. If the transistor 11 of the first stage was placed in the low impedance condition by the first input pulse, the current through that transistor 11 has produced a drop across the capacitor 27 attached thereto, which drop is shifted to increase the voltage across the next memory stage thus shifting that stage to the low impedance state.

It is apparent that the novel incorporation of elements whereby all operations are initiated by either of the two inputs is effective to reduce size and circuit complication. The use of the capacitor 54 in series with the transistors 50 and 51, and connected to the Zener diode 61 and the transistor 67, effectively unitizes and simplifies the clearing, delay and shifting functions. The integrating circuitry including the capacitor 31 effectively eliminates the need for further control means to time and apply low-impedance-state conditioning pulses to the first memory stage after the clearing of that stage.

It is to be understood that the above-described arrangement is illustrative of the application of the principles of this invention. Numerous other arrangements may be devised by those skilled in the art without departing from the spirit and scope of the invention.

What is claimed is:

1. A shift register circuit comprising a plurality of memory stages, each of said stages including a single bistable device, first input means operative to place said device in a first state of operation, second input means including chargeable means operative to place said device in a second state of operation, and output means; capacitive means serially connecting said output means of each of said stages to said first input means of the next succeeding one of said stages; shifting means including Zener diode means operative responsive to the charge on said chargeable means for providing a pulse to said capacitive means; first pulse source means for operating both said first input means to a first one of said stages and said second input means; and second pulse source means for operating said second input means.

2. A shift register circuit as in claim 1 wherein said shifting means includes a source of reference potential and switching means operative responsive to the breakdown of said Zener diode means to connect said capacitive means to said source of reference potential.

3. A shift register circuit as in claim 2 wherein said switching means includes a transistor having a base terminal connected to said Zener diode means, an emitter terminal connected to said source of reference potential, and a collector terminal connected to said capacitive means.

4. A shift register circuit comprising a plurality of memory stages, each of said stages including a two-terminal device capable of two-state operation, first input means for placing said device in a first state of operation, second input means for placing said device in a second state of operation, and output means; capacitive means serially connecting said output means of each of said stages to said first input means of the next succeeding one of said stages; clearing means including chargeable means for operating said second input means of all of said stages; first pulse source means for operating said clearing means and said first input means of a first one of said stages; second pulse source means for operating said clearing means; and shifting means connected to and operative in response to the operation of said clearing means for pulsing all of said capacitive means, said shifting means including Zener diode means operative responsive to the charge on said chargeable means for delaying the pulsing of said capacitive means until the operation of said second input means.

5. A shift register comprising a plurality of serially-connected bistable memory stages each including a single two-terminal PNPN junction transistor as the main memory element; input means connected to each of said stages for placing each of said stages in a first and a second condition of operation, said input means comprising a first means for increasing the voltage across a first one of said PNPN transistors and a second means for lowering the voltage across all of said PNPN transistors, said second means including a switching PNPN transistor connected to a source of potential and a first capacitive means, said switching transistor operative in response to an input pulse to function in a low impedance state to connect the potential from said source to each of said PNPN transistors of said memory stages and to revert to a high impedance state after a predetermined period in response to the action of said first capacitive means; shifting means responsive to said second means for shifting the condition of each of said stages to the next succeeding one of said stages; and output means connected to each of said stages.

6. A shift register circuit as in claim 5 wherein said shifting means includes a second plurality of capacitors serially connecting said memory stages, a source of reference potential, and switching means connected to said second means operative, after a suitable delay from the operation of said second means, to connect said source of reference potential to each of said second plurality of capacitors.

7. A shift register as in claim 6 wherein said shifting means includes a Zener diode connecting said switching means and said first capacitive means operative upon the build-up of a predetermined voltage on said first capacitive means to transfer a voltage pulse to said switching means.

8. A shift register as in claim 7 wherein said switching means includes an NPN junction transistor having a base terminal connected to said Zener diode, an emitter terminal connected to said source of reference potential, and a collector terminal connected to all of said second plurality of capacitors.

9. A shift register comprising a plurality of serially-connected bistable memory stages, input means to place each of said stages in a first and a second condition of operation, said input means including a first and a second means for changing the potential at each of said stages, said second means including a two-terminal PNPN junction transistor connected to each memory stage and to a first source of reference potential and capable of operation in a high impedance state and a low impedance state, shifting means for shifting the condition of each of said stages to the next succeeding one of said stages, said shifting means including a switch connected to each of said memory stages and a second source of reference potential connected to said switch, said switch being operative to apply said reference potential to each of said stages in response to the application of a predetermined voltage from said second means, and output means connected to each of said stages.

10. A shift register as in claim 9 wherein said output means includes amplifying means.

11. A shift register comprising a plurality of serially-connected bistable memory stages, each of said stages including a single two-terminal PNPN junction transistor capable of operation in a high impedance condition for currents below a predetermined value and in a low impedance condition for currents greater than said predetermined value; a first input means operative to place each of said transistors in said high impedance condition of operation including switching means, a first capacitor and a first source of potential connected to said switching means, pulse source means for operating said switching means to connect said first source of potential to each of said stages and lower the current through said transistors below said predetermined value; a second input means operative to place a first one of said transistors in said low impedance condition; shifting means for shifting the condition of each of said stages to the next succeeding one of said stages, said shifting means including a plurality of capacitors serially connecting each of said stages, the charge on each of said plurality of capacitors being indicative of the current through the preceding one of said stages, a second source of potential, and means operative in response to the charge on said first capacitor to connect said second source of potential to said plurality of capacitors; and output means connected to each of said stages.

12. A shift register circuit as in claim 11 wherein said output means includes a plurality of transistor amplifiers, one of said amplifiers connected to each of said PNPN transistors.

13. A shift register as in claim 11 wherein said second input means includes a third source of potential, a means for connecting said third source to said first one of said transistors to raise the current therethrough above said predetermined value, and means for operating said first input means prior to so connecting said third source.

14. A shift register circuit including a plurality of two-state memory stages; input means connected to each of said stages; memory means serially connecting said stages; and a clearing circuit comprising bistable means connected to each of said stages and capable of operation in a low and a high impedance state, a source of potential inadequate to operate said bistable means in said low impedance state connected thereto, a capacitor connected to said bistable means, pulse source means connected to said bistable means for providing sufficient current thereto to operate said bistable means in said low impedance condition, voltage dependent switching means connected to said memory means for conditioning said memory means, and a Zener diode connected to said bistable means and said switching means for operating said switching means upon the accumulation of sufficient charge on said capacitor.

15. A delay circuit as in claim 14 wherein said bistable means includes a two-terminal PNPN junction transistor.

16. A delay circuit as in claim 14 wherein said switching means includes an NPN transistor connected to said Zener diode.

References Cited in the file of this patent

UNITED STATES PATENTS

| | | |
|---|---|---|
| 2,591,961 | Moore | Apr. 8, 1952 |
| 2,666,575 | Edwards | Jan. 19, 1954 |
| 2,803,812 | Rajchman | Aug. 20, 1957 |
| 2,820,153 | Woll | Jan. 14, 1958 |
| 2,861,201 | Cooke-Yarborough | Nov. 18, 1958 |
| 2,866,178 | Lo | Dec. 23, 1958 |
| 2,910,596 | Carlson | Oct. 27, 1959 |
| 2,912,598 | Shockley | Nov. 10, 1959 |

OTHER REFERENCES

Reference I, Digest of Technical Papers, 1958, Transistor and Solid-State Circuits Conference, page 12, Figure 2, co-sponsored by I.R.E. and S.I.E.E.

"The Four-Layer Diode" by Dr. W. Shockley, Electronics Industries, August 1957, pages 58–60, and 161 to 165.